US007767069B2

(12) United States Patent
Lee et al.

(10) Patent No.: US 7,767,069 B2
(45) Date of Patent: Aug. 3, 2010

(54) METHOD FOR CONTROLLING THE CONTACT ANGLE OF A DROPLET IN ELECTROWETTING AND AN APPARATUS USING THE DROPLET FORMED THEREBY

(75) Inventors: Jeong Gun Lee, Seoul (KR); Hye Jung Cho, Anyang-si (KR); Nam Huh, Seoul (KR); Sung Jae Kim, Pohang-si (KR)

(73) Assignee: Samsung Electronics Co., Ltd. (KR)

( * ) Notice: Subject to any disclaimer, the term of this patent is extended or adjusted under 35 U.S.C. 154(b) by 316 days.

(21) Appl. No.: 11/536,319

(22) Filed: Sep. 28, 2006

(65) Prior Publication Data

US 2007/0170059 A1 Jul. 26, 2007

(30) Foreign Application Priority Data

Sep. 28, 2005 (KR) ..................... 10-2005-0090486

(51) Int. Cl.
*G01N 27/447* (2006.01)

(52) U.S. Cl. ..................................................... 204/450

(58) Field of Classification Search ......... 204/450–455, 204/600–605

See application file for complete search history.

(56) References Cited

U.S. PATENT DOCUMENTS 6,565,727 B1 5/2003 Shenderov
7,547,380 B2 * 6/2009 Velev ......................... 204/547
2002/0043463 A1 4/2002 Shenderov
2004/0058450 A1 3/2004 Pamula et al.

FOREIGN PATENT DOCUMENTS

JP 2005-257569 9/2005

OTHER PUBLICATIONS

Verheijen et al. "Reversible Electrowetting and Trapping of Charge: Model and Experiments," Langmuir 1999, 15, 6616-6620.*
Kamiya et al. Electrowetting on silicon single-crystal substrate, Contact Angle, Wettability and Adhesion, vol. 2, pp. 507-520.*
Coating Materials for Electronic Applications by J.J. Licari and published by William Andrews Publishing in 2003, pp. 157-168.*
Ren et al. "Automated on-chip droplet dispensing with volume control by electro-wetting actuation and capacitance metering," Sensors and Actuators B 98 (2004) 319-327.*
Japanese Office Action; Application No. 2006-263977; Dated Oct. 27, 2008.
Office action issued by the European Patent Office on Sep. 28, 2009.

* cited by examiner

*Primary Examiner*—Alex Noguerola
(74) *Attorney, Agent, or Firm*—Cantor Colburn LLP

(57) ABSTRACT

A method for controlling the hydrophilic droplet using the electrowetting principle is disclosed. More specifically, the present invention provides a method for increasing the change of the contact angle in the interface that is formed between the hydrophilic droplet and the nonpolar fluid by adding a constant concentration of two-element electrolyte or three-element electrolyte to the hydrophilic droplet; and an apparatus for controlling the droplet having the change of the contact angle and velocity scope increased by the method.

11 Claims, 7 Drawing Sheets

METHOD FOR CONTROLLING THE CONTACT ANGLE OF A DROPLET IN ELECTROWETTING AND AN APPARATUS USING THE DROPLET FORMED THEREBY

This application claims priority to Korean Patent Application No. 10-2005-0090486, filed Sep. 28, 2005, and all the benefits accruing therefrom under 35 U.S.C. § 119, the entire contents of which are hereby incorporated by reference.

BACKGROUND OF THE INVENTION

1. Field of the Invention

The present invention relates to a method for controlling a hydrophilic droplet using the principle of electrowetting, and more particularly, to a method for controlling the contact angle of the droplet in electrowetting and an apparatus for controlling the droplet formed by the method.

2. Description of the Related Art

Recently, there has been an increasing interest in a micro total analysis system (μTAS). A type of μTAS, lab-on-a-chip (LOC) has been studied for embodying on one chip all processes such as sampling, pre-treating and reacting the sample, and separating and analyzing the reacted sample.

One issue in the development of such an LOC is the control of a micro flow field for carrying out several processes within the LOC. Among the currently used methods to control the micro flow field in the LOC, are methods that employ a syringe pump, electroosmosis and HPLC (High Performance Liquid Chromatography), or the like, especially to control the transfer of the micro flow field. In this regard, the syringe pump, HPLC, and the like, have disadvantages in that the flow shows a pulsatory form. In addition, the costs are therefore increased. Electro-osmosis displays a slow ability to control the flow velocity and requires high voltage.

Meanwhile, surface tension is one of the forces that act on a fluid in the micro flow field. In one method for controlling the flow by using such surface tension, Lippmann proposes electrocapillarity that uses the capillary force change of the electrolyte solution while changing the metal surface by using an externally applied electrostatic charge. However, the flow field control method using such electrocapillarity has drawbacks in that the electricity may flow in the fluid and the surface conditions can be varied by electrochemical reaction brought on by the use of the electricity.

In order to overcome the drawback raised by the electrocapillarity, electrowetting, which controls the hydrophilic droplet by applying an external voltage is used. In electrowetting, the hydrophilic droplet is disposed upon a metal electrode coated with an insulating material, rather than contacting the hydrophilic droplet directly with the metal electrode.

The electrowetting using the surface tension of the hydrophilic droplet can effectively control the flowing of the droplet with a low voltage of several volts using a MEMS (micro electromechanical system). A micro electromechanical system is simple and economical to fabricate. Further, it is nondestructive and can save the sample for further use and analysis, when compared with other methods that employ flow control after filling a microchannel with a fluid.

U.S. Pat. No. 6,565,727 discloses a technique that continuously forms an electrode patch that changes the contact angle of the droplet using a simple electrowetting principle and applies a voltage to the electrode patch through an electric circuit so as to facilitate the distribution, mixing and transportation of the droplet. This patent allows each droplet that overcomes limitations of a consecutive fluid operation method used in the conventional microfluid system to be subjected to a dioxide process, thereby resulting in an operation method of low power and rapid speed.

Based on this patent, there have been developments for microfluid system operation methods using the more improved electrowetting principle applicable for LOC.

Furthermore, a liquid lens attracting public attention in CeBIT 2004 is characterized in that if a voltage is applied to a polar solvent and a nonpolar solvent using the electrowetting phenomenon, a certain curvature is formed on the contact surface between two fluids and thus the focus can be automatically adjusted depending on the distance from the object without the mechanical operation as in the conventional optical lens.

Such liquid lens camera module is similar to the eye lens of human being in that a thickness of the lens is changed automatically depending on the distance from the object to adjust the focus. Since the liquid lens allows for proximate photographing at a distance of 5 cm, it can recognize a fingerprint or character by a cellular phone. Moreover, because it only takes 2/100 second to adjust the focus and the cost of production is about 40% lower than that of the conventional optical lens, the liquid lens is expected as a promising alternative to the optical lens.

Meanwhile, the hydrophilic droplet used in the methods for controlling the droplet using the electrowetting principle hitherto known has a low electrowetting threshold voltage, thereby involving problems that the contact angle change of the droplet is not sufficiently wide and the velocity scope of the droplet is not so large.

SUMMARY OF THE INVENTION

Accordingly, the inventors have endeavored to solve the above problems and found that if a specific electrolyte having a certain concentration is added to the hydrophilic droplet in controlling the hydrophilic droplet using the electrowetting principle, the electrowetting threshold voltage increases and thus the contact angle change of the hydrophilic droplet also increases accordingly.

Therefore, the invention provides a method for increasing the change of the contact angle and velocity scope of the droplet in the interface between hydrophobicity and hydrophilicity of the hydrophilic droplet by increasing the electrowetting threshold voltage.

The invention also provides an apparatus for controlling the droplet that is formed with the change of the contact angle. The velocity scope is also increased by the method for increasing the change of the contact angle. This improves the operatability of the apparatus to which the electrowetting principle is applied, such as, for example, LOC or liquid lens.

The other advantages of the invention will be understood by the following description and will also be appreciated by the embodiments of the invention more clearly.

BRIEF DESCRIPTION OF DRAWINGS

The above features of the instant invention will become apparent from the following description of preferred embodiments taken in conjunction with the accompanying drawings, in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. The terms "a" and "an" do not denote a limitation of quantity, but rather denote the presence of at least one of the referenced item. The term "or" means "and/or". The terms "comprising", "having", "including", and "containing" are to be construed as open-ended terms (i.e., meaning "including, but not limited to").

To accomplish this, there is provided a method for increasing the change of the contact angle and velocity scope in the interface formed by the hydrophilic droplet and the nonpolar fluid by adding two-element electrolyte or three-element electrolyte to the hydrophilic droplet. This addition is accomplished in a droplet control method using the electrowetting principle such that the contact angle of the electrowetting is changed if an external voltage is applied to the hydrophilic droplet on the electrode coated with the insulating material.

First, the electrowetting principle used in the present invention will be explained.

The electrowetting is named based on the fact that it can change a surface shape of the droplet depending on the voltage change applied to a thin insulating membrane coated between the metal plate and the droplet. The voltage change permits controlling the surface tension at a low voltage. The voltage change permits the droplet to spread on the metal plate in proportion to the voltage, thereby changing the droplet-insulating interface to change from being non-wetting to being wetting.

Figure 1:
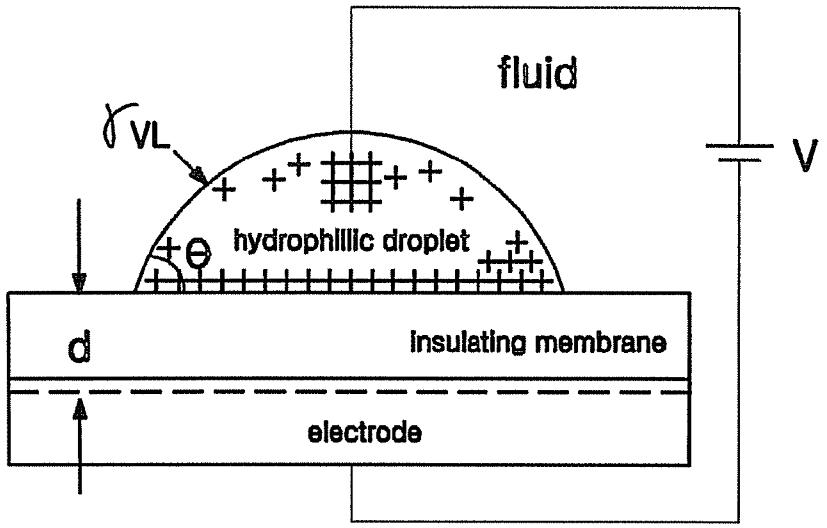
FIG. 1 is a schematic diagram illustrating a concept for embodying the electrowetting principle.

More specifically, the electrowetting means that if the external voltage (V) is applied to the hydrophilic droplet after the hydrophilic droplet is dropped on the electrode coated with the insulating material as shown in FIG. 1, the contact angle (θ) of the droplet is changed.

The contact angle (θ) can be calculated according to the following equation:

$$\cos\theta = \cos\theta_\alpha + \frac{\varepsilon_0 \varepsilon_r V^2}{2\gamma_{VL} d}$$

wherein $\epsilon$ is permittivity of the insulating material, $\gamma_{VL}$ is an interfacial tension between the fluid and the droplet, d is a thickness of the insulating membrane, and V is the voltage applied from the outside.

From the above equation, it can be determined that it is preferred that the voltage is higher and the thickness of the insulating membrane is thinner in order to increase the change range of the contact angle. As a result, there is the threshold voltage ($V_C$) where the contact angle is no longer changed. Increasing the voltage further only results in a dielectric breakdown of the insulating membrane.

Therefore, in consideration of the fact that the insulating membrane is of a certain thickness, it is preferable to change the interfacial features of the droplet to enable an increase the applied external voltage. In other words, the threshold voltage of the droplet can be changed to increase the change range of the contact angle rather than minimizing the thickness of the insulating membrane.

The present invention was accomplished by ascertaining the fact that if a two-element electrolyte or three-element electrolyte is added to the hydrophilic droplet, the threshold voltage of the droplet is considerably increased compared with the threshold voltage prior to the adding of the electrolyte.

Thus, if the hydrophilic droplet includes one or more materials selected from the group consisting of an ionic particle, a neutral particle, a biomaterial and a magnetic particle, the interfacial feature of the droplet gets worse. According to the present invention, although such particles are included, the threshold voltage of the droplet can be significantly increased so that it has the interfacial features that permit its use in a LOC. Here, the biomaterial includes at least one material selected from the group consisting of a nucleic acid, a protein, a peptide, a bacterium, a virus and a mammal cell.

In the present invention, it is preferable that the nonpolar fluid that forms the interface with the hydrophilic droplet is oil or air.

Further, the insulating material preferably includes more than one material selected from the group consisting of Parylene C, TEFLON® (polytetrafluoroethylene) and metal oxide membrane; and the electrode preferably includes more than one material selected from the group consisting of indium tin oxide (ITO), Au/Cr (gold/chromium), Al (aluminum) and a conductive polymer.

Examples of metal oxide membranes are silica, alumina, ceria, titania, zirconia, or the like, or a combination comprising at least one of the foregoing metal oxides.

Meanwhile, it is preferable that the two-element electrolyte used in the present invention is one or more material selected from alkali metal halides including LiCl, KCl and NaCl, and the three-element electrolyte is one or more material selected from alkali metal sulfates or alkali metal nitrates. Examples of such metal sulfates and metal nitrates include $K_2SO_4$ and $Na_2SO_4$. The salts listed above were used in confirming the effect of the present invention because they are compatible with the biomaterials used in LOC and do not facilitate the formation of any precipitates.

At this time, the two-element electrolyte or three-element electrolyte is preferably added in the concentration of 1 mM to 100 mM, and more preferably 1 mM to 30 mM, as will be explained in Example 1.

Further, if a neutral particle is included in the hydrophilic droplet, the two-element electrolyte or three-element electrolyte is preferably added in the concentration of 1 mM to 100 mM, and more preferably 10 mM to 30 mM.

In addition, if a particle having a negative charge or positive charge is added to the droplet, the two-element electrolyte or three-element electrolyte is preferably added in the concentration of 30 mM to 150 mM, and more preferably 30 mM to 100 mM.

Figure 9:
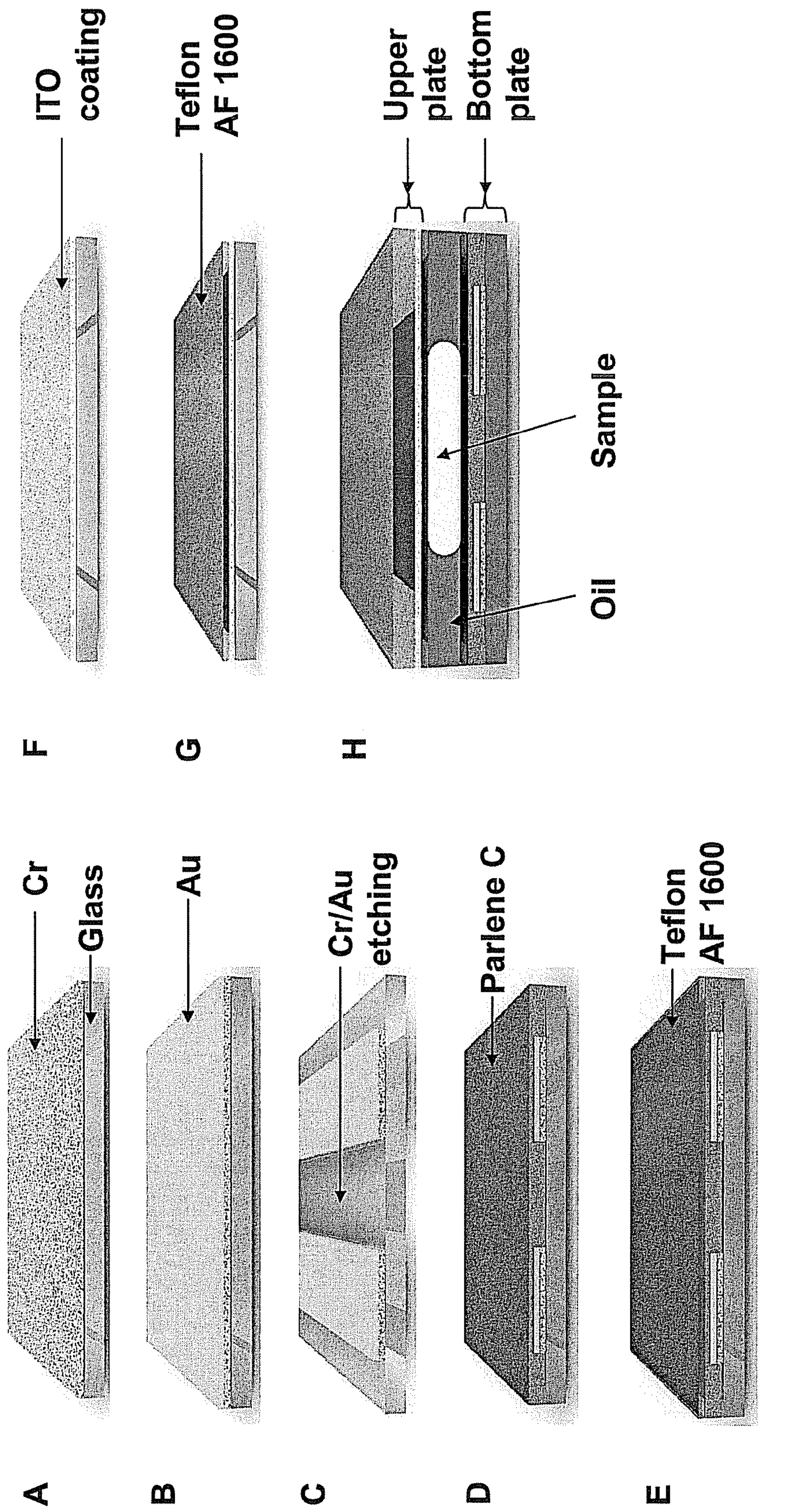
FIG. 9 is a schematic that depicts the structure and the method of manufacturing of the droplet control apparatus.

The present invention also provides a droplet control apparatus comprising a first non-conductive substrate; a first electrode arranged on an upper side of the first substrate; a second non-conductive substrate arranged opposite to the upper side of the first substrate to form a predetermined space; a second electrode arranged on the surface of the second substrate adjacently to the space; wherein the second electrode is opposed to the first electrode; an insulating membrane positioned between the space and the first electrode or between the space and the second electrode; a hydrophobic membrane positioned between the space and the first electrode or between the space and the second electrode; a hydrophilic droplet located in the space and comprising two-element electrolyte or three-element electrolyte; and a nonpolar fluid located in the space. FIG. 9 provides a depiction of the droplet control apparatus.

The first non-conductive substrate and the second non-conductive substrate can be a plain plate or curved structure without any limitations on their shape, and be made with any non-conductive materials.

Further, the first and the second electrodes, which are arranged opposite to the surfaces of the first substrate and the second substrate in the space formed between the first substrate and the second substrate, are preferably formed to include one or more materials selected from the group consisting of indium tin oxide (ITO), Au/Cr (gold/chromium), Al (aluminum) and a conductive polymer. Examples of conductive polymers are polyacetylene, polypyrrole, polyaniline, polythiophene, or the like, or a combination comprising at least one of the foregoing conductive polymers.

Also, the insulating membrane is preferably formed to include one or more materials selected from the group consisting of Parylene C, TEFLON® and metal oxide. The hydrophobic membrane can be made with any materials having the hydrophobicity.

Therefore, the droplet control apparatus of the present invention is made in such a manner that the insulating membrane is formed only on either the first electrode or the second electrode. Thus, the voltage is applied to the hydrophilic droplet including two-element electrolyte or three-element electrolyte positioned in the space and the droplet is controlled by the applied external voltage. At this time, the threshold voltage of the droplet is increased to increase the change of the contact angle as well as the velocity scope) of the droplet in the interface formed between the droplet and the nonpolar fluid, thereby controlling the droplet more precisely.

Further, in case of LOC (lab-on-a-chip) to which the droplet control apparatus of the present invention is applied, the droplet can move electrically under the voltage of 50 V to 140 V and such movement is accomplished in such a way that the electrowetting is induced by applying electricity only to the interface of the droplet in the direction where the movement is desired. As such, if the droplet control apparatus of the present invention is utilized in the micro flow field transport of LOC, it is possible to obtain quicker movement than the transport obtained when using a conventional droplet.

Therefore, in a LOC, a sample containing a biomolecule to be experimented with or analyzed can be transported to a desired position through the droplet by using the electric field. Here, since the electrical current does not flow, the LOC does not cause power consumption and has little influence on the biomolecule contained in the sample.

The droplet having the increased change of the contact angle and velocity scope and the apparatus for controlling such droplet can also be used in the formation, manipulation and control of a liquid lens. The liquid lens controls the thickness and focal distance of the lens (the boundary surface or interface with non-conductive oily liquid) by raising or lowering the voltage that is applied to the electrolyte solution filled in the airtight space using the electrowetting principle. Thus, such liquid lens is known to have an advantage in that it can adjust a refractive index by itself like the eye lens, which is favorable to miniaturization and makes the cost of production inexpensiave.

The droplet can be controlled more easily, and thus, the operation properties of the liquid lens can be improved significantly.

Hereinafter, the present invention will be described in detail with reference to the following examples. These examples are provided to illustrate the present invention merely; and therefore, it should be interpreted not to limit the scope of the present invention.

COMPARATIVE EXAMPLE 1

Figure 2:
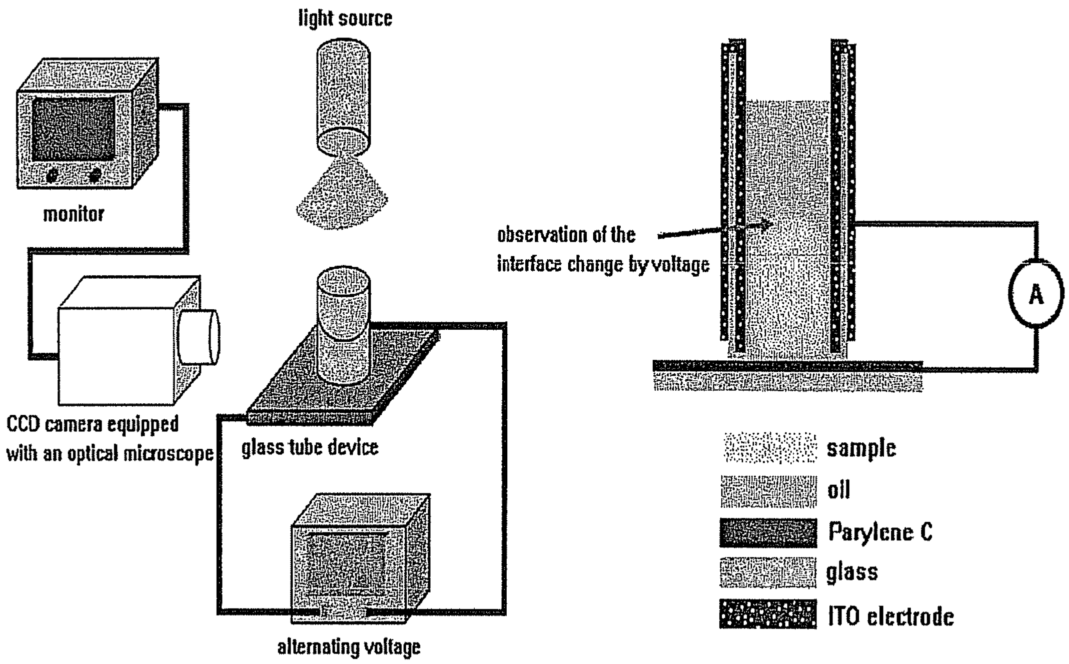
FIG. 2 is a schematic diagram showing the apparatus using capillary glass tube to perform an experiment for ascertaining the change of the contact angle of the droplet in controlling a droplet using electrowetting in the method of the present invention.

An apparatus using a capillary glass tube for carrying out the experiment for confirming the contact angle change of the droplet shown in FIG. 2 was used to observe the contact angle change of the droplet used in the droplet control method by the electrowetting principle. The apparatus is comprised of a glass tube device, a power supply, a computer, a CCD camera equipped with an optical microscope, and a light source.

In the glass tube device, an ITO thin film was deposited on the glass plate to install the electrode. Thereafter, the ITO thin film was deposited on the ITO electrode as shown in FIG. 2. Here, an insulating membrane was formed on the ITO electrode of the inner surface of the glass tube. The insulating membrane has an excellent optical transparency and biocompatibility and is formed by coating the hydrophobic Parylene C (contact angle: ~104°) in the thickness of 2.5 μm on the ITO electrode by using chemical deposition.

PBS (1 mM sodium phosphate, 15 mM NaCl, pH 7.4) was dropped to the glass tube of the glass tube device as configured above by using a micropipette. Thereafter, the alternating voltage less than 1 kHz/140 V was applied from the power supply and then the contact angle change of the PBS droplet was observed to find the threshold voltage at which the dielectric breakdown of the insulating membrane occurs. At this time, the contact angle change of the PBS droplet according to the voltage change was photographed by the CCD camera and the images photographed by the camera were stored as image files by using A/D board, image board and software installed in the computer.

The bubbles were observed in the PBS droplet, the bubbles being caused by electrolysis due to the dielectric breakdown of the insulating membrane at 60V, which means that the threshold voltage of the droplet is 60V.

COMPARATIVE EXAMPLE 2-1

The contact angle change was observed by conducting an experiment in the same method as Comparative Example 1 except that *E. coli* of a cylinder form ranging from 1 μm to 3 μm (that is weak hydrophobic but miscible with water, and is considered as an almost neutral particle though it has a very weak negative charge) was further included in the PBS. It can be found that the bubbles caused by electrolysis due to the dielectric breakdown of the insulating membrane at 54V were observed in the PBS droplet comprising *E. coli*, which means that the threshold voltage of the PBS droplet comprising *E. coli* is 54V.

COMPARATIVE EXAMPLE 2-2

The contact angle change was observed by conducting an experiment in the same method as Comparative Example 1 except that 2% v/v of a polystyrene (PS) bead of 4.16 μm (that is hydrophobic but miscible with water, and is considered as an almost neutral particle though it has a very weak negative charge) was further included in the PBS. It can be seen that the bubbles caused by electrolysis due to the dielectric breakdown of the insulating membrane at 54V were observed in the PBS droplet comprising the PS bead, which means that the threshold voltage of the PBS droplet comprising the PS bead is 54V.

COMPARATIVE EXAMPLE 3-1

The contact angle change was observed by conducting an experiment in the same method as Comparative Example 1 except that 2% v/v of a magnetic bead ($COO^-$ bead) terminated with the carboxylic acid group of 1.05 μm (that has a hydrophilic surface and a negative charge) was further included in the PBS. It can be found that the bubbles caused by electrolysis due to the dielectric breakdown of the insulating membrane at 58V were observed in the PBS droplet comprising the $COO^-$ bead, which means that the threshold voltage of the PBS droplet comprising the $COO^-$ bead is 58V.

COMPARATIVE EXAMPLE 3-2

The contact angle change was observed by conducting an experiment in the same method as Comparative Example 1 except that 2% v/v of a magnetic bead ($NH^{2+}$ bead) terminated with the amine group of 1.5 μm (that has a hydrophilic surface and a positive charge) was further included in the PBS. It can be confirmed that the bubbles caused by electrolysis due to the dielectric breakdown of the insulating membrane at 53V were observed in the PBS droplet comprising the $NH^{2+}$ bead, which means that the threshold voltage of the PBS droplet comprising the $NH^{2+}$ bead is 53V.

From these experimental results, it was noticed that the threshold voltage of the droplet (the PBS droplet) is 60V, and if the droplet further comprises either a neutral particle, a negative charge particle, a positive charge particle, or the like, the droplet shows the lower threshold voltage than that of the PBS droplet. Therefore, it can be recognized that there is a need for a novel method that is capable of increasing the range of the contact angle change by raising the threshold voltage.

EXAMPLE 1-1

The contact angle change of the PBS droplet was observed by conducting an experiment in the same method as Comparative Example 1 except that 1 mM of $Na_2SO_4$ was further included in the PBS in order to find the threshold voltage at which the dielectric breakdown of the insulating membrane occurs. The bubbles caused by electrolysis due to the dielectric breakdown of the insulating membrane at 85V were observed in the PBS droplet comprising $Na_2SO_4$. It is therefeefore determined that the threshold voltage of the PBS droplet comprising $Na_2SO_4$ is 85V.

EXAMPLE 1-2

The contact angle change of the PBS droplet was observed by conducting an experiment in the same method as Comparative Example I except that 10 mM of $Na_2SO_4$ was further included in the PBS in order to find the threshold voltage at which the dielectric breakdown of the insulating membrane occurs. The bubbles caused by electrolysis due to the dielectric breakdown of the insulating membrane at 110V were observed in the PBS droplet comprising $Na_2SO_4$, therefore, it can be noted that the threshold voltage gets increased as $Na_2SO_4$ is added (see FIG. 3).

EXAMPLE 1-3

The contact angle change of the PBS droplet was observed by conducting an experiment in the same method as Comparative Example 1 except that 1 mM of KCl was further included in the PBS in order to find the threshold voltage at which the dielectric breakdown of the insulating membrane occurs. It can be seen that the bubbles caused by electrolysis due to the dielectric breakdown of the insulating membrane at 65V were observed in the PBS droplet comprising 1 mM of KCl, which means that the threshold voltage is 65V.

EXAMPLE 1-4

The contact angle change of the PBS droplet was observed by conducting an experiment in the same method as Comparative Example 1 except that 10 mM of KCl was further included in the PBS in order to find the threshold voltage at which the dielectric breakdown of the insulating membrane occurs. It can be found that the bubbles caused by electrolysis due to the dielectric breakdown of the insulating membrane at 90V were observed in the PBS droplet comprising 10 mM of KCl, which means that the threshold voltage of the PBS droplet comprising KCl is 90V.

Figure 3:
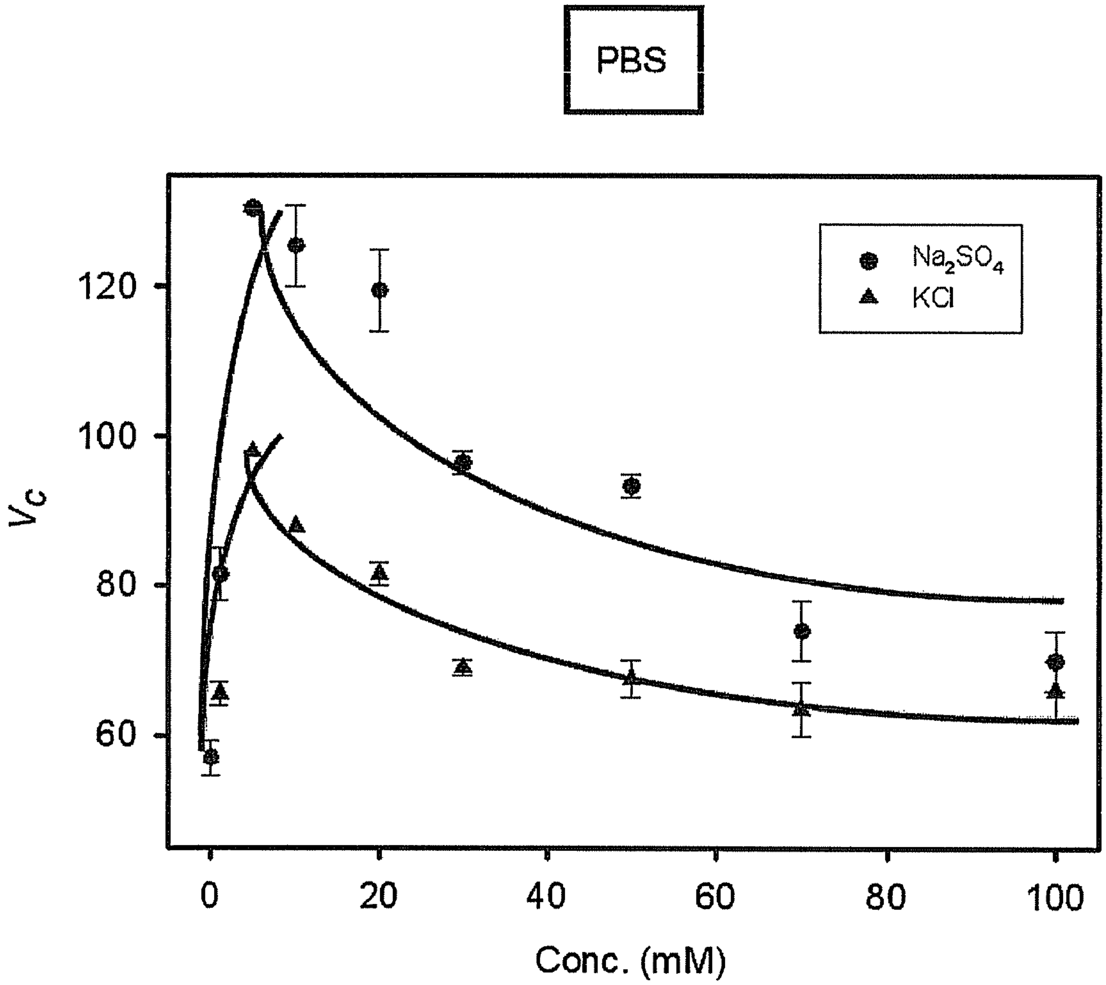
FIG. 3 is a graph showing a threshold voltage measured while changing a concentration of an electrolyte added in Example 1.

Therefore, it can be noted that the threshold voltage is increased as the concentration of KCl is increased (see FIG. 3).

Based on Example 1, it can be seen that if the droplet further comprises the two-element electrolyte or three-element electrolyte, the droplet shows significantly greater threshold voltage than that obtained in Comparative Example 1, that is, 60V.

EXAMPLE 2-1

The contact angle change of the PBS droplet was observed by conducting an experiment in the same method as Comparative Example 2-1 except that 10 mM of $Na_2SO_4$ was further included in the PBS. The bubbles caused by electrolysis due to the dielectric breakdown of the insulating membrane at 91V were observed in the PBS droplet comprising $Na_2SO_4$. Therefore, although the PBS droplet comprising *E. coli* shows the threshold voltage of 51V, it can be noted that if 10 mM of $Na_2SO_4$ was further included in the PBS droplet comprising *E. coli*, the droplet has the noticeably increased threshold voltage of 91V.

EXAMPLE 2-2

The contact angle change of the PBS droplet was observed by conducting an experiment in the same method as Comparative Example 2-2 except that 10 mM of $Na_2SO_4$ was further included in the PBS. The bubbles caused by electrolysis due to the dielectric breakdown of the insulating membrane at 79V were observed in the PBS droplet comprising $Na_2SO_4$. Therefore, although the PBS droplet comprising PS bead shows the threshold voltage of 54V, it can be noted that if 10 mM of $Na_2SO_4$ was further included in the PBS droplet comprising the PS bead, the droplet has the noticeably increased threshold voltage of 79V.

From the results of Example 2, it can be noted that if the PBS droplet including the neutral particle further comprises the three-element electrolyte, the droplet shows a significantly greater threshold voltage than 51V obtained in Comparative Example 2-1 and 54V obtained in Comparative Example 2-2.

EXAMPLE 3-1

The contact angle change of the PBS droplet was observed by conducting an experiment in the same method as Comparative Example 3-1 except that 10 mM of $Na_2SO_4$ was further included in the PBS. The bubbles caused by electrolysis due to the dielectric breakdown of the insulating membrane at 105V were observed in the PBS droplet comprising $Na_2SO_4$. Therefore, although the PBS droplet comprising the COOH bead shows the threshold voltage of 58V, it can be noted that if 10 mM of $Na_2SO_4$ was further included in the PBS droplet comprising the COOH bead, the droplet has the noticeably increased threshold voltage of 105V.

EXAMPLE 3-2

The contact angle change of the PBS droplet was observed by conducting an experiment in the same method as Comparative Example 3-2 except that 10 mM of $Na_2SO_4$ was further included in the PBS. The bubbles caused by electrolysis due to the dielectric breakdown of the insulating membrane at 78V were observed in the PBS droplet comprising $Na_2SO_4$. Therefore, although the PBS droplet comprising the $NH^{2+}$ bead shows the threshold voltage of 53V, it can be noted that if 10 mM of $Na_2SO_4$ was further included in the PBS droplet comprising the $NH^{2+}$ bead, the droplet has the noticeably increased threshold voltage of 78V.

As seen from the results of Example 3, if the PBS droplet including the particle having the negative charge or positive charge further comprises the three-element electrolyte, the droplet shows a significantly greater threshold voltage than 58V obtained in Comparative Example 3-1 and 53V obtained in Comparative Example 3-2.

With reference to FIG. 3 which depicts the threshold voltage measured while changing the concentration of the electrolyte added in Example 1, it can be recognized that the added two-element electrolyte or three-element electrolyte increases the threshold voltage effectively in the concentration range of 1 mM to 100 mM, especially 1 mM to 30 mM.

Figure 4A:
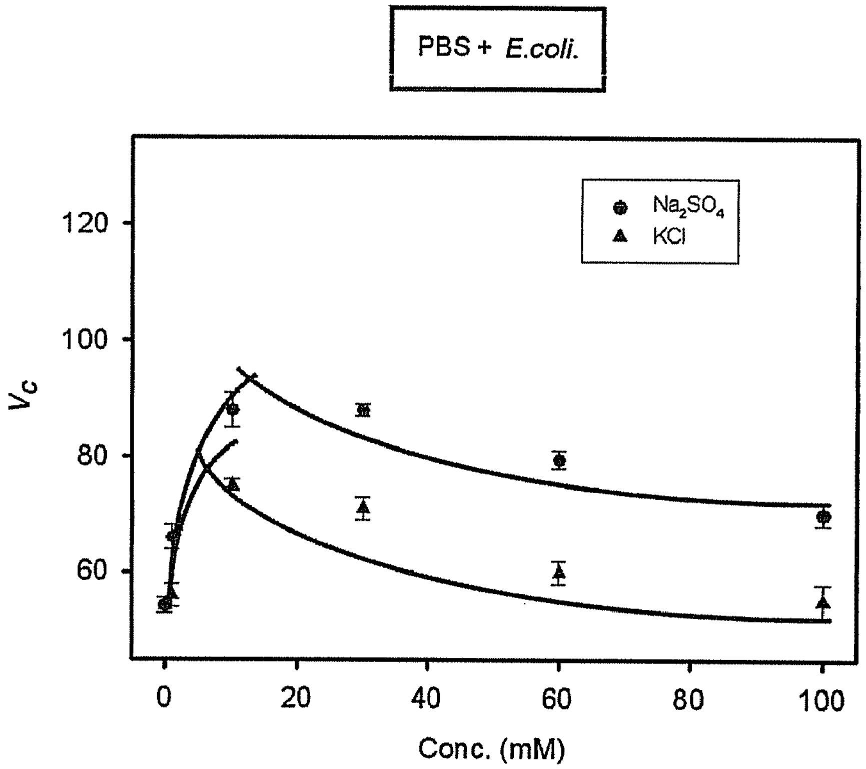
FIGS. 4A and 4B are graphs showing a threshold voltage measured while changing a concentration of an electrolyte added in Examples 2-1 and 2-2, respectively.
Figure 4B:
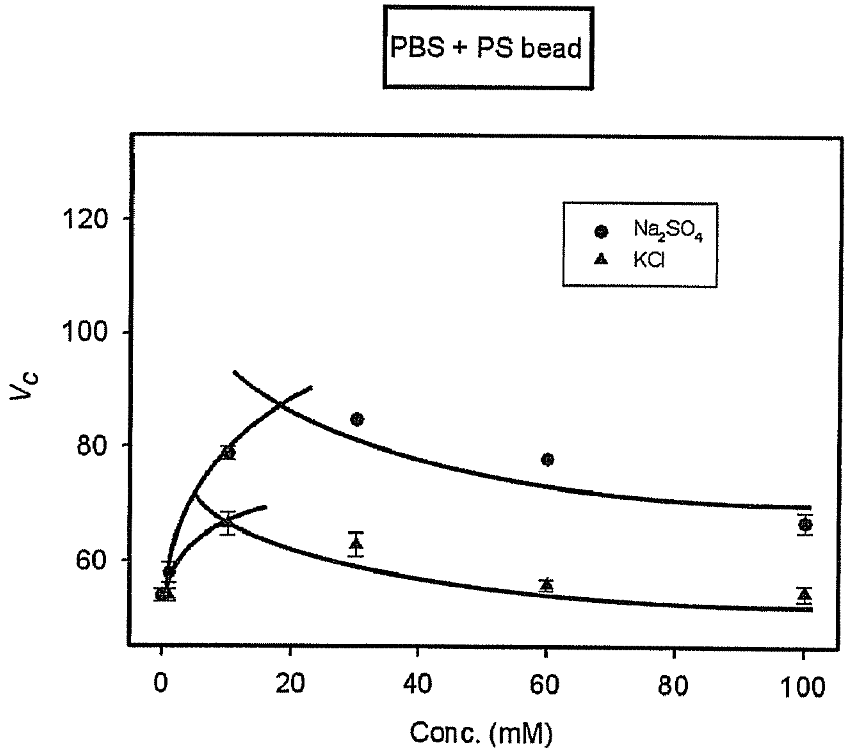

With reference to FIGS. 4A and 4B which depicts the threshold voltage measured while changing the concentration of the electrolyte added in Example 2 as graphs, it can be noted that if the neutral particle is included in the droplet, the two-element electrolyte or three-element electrolyte increases the threshold voltage effectively in the concentration range of 1 mM to 100 mM, especially of 1 mM to 30 mM.

Figure 5A:
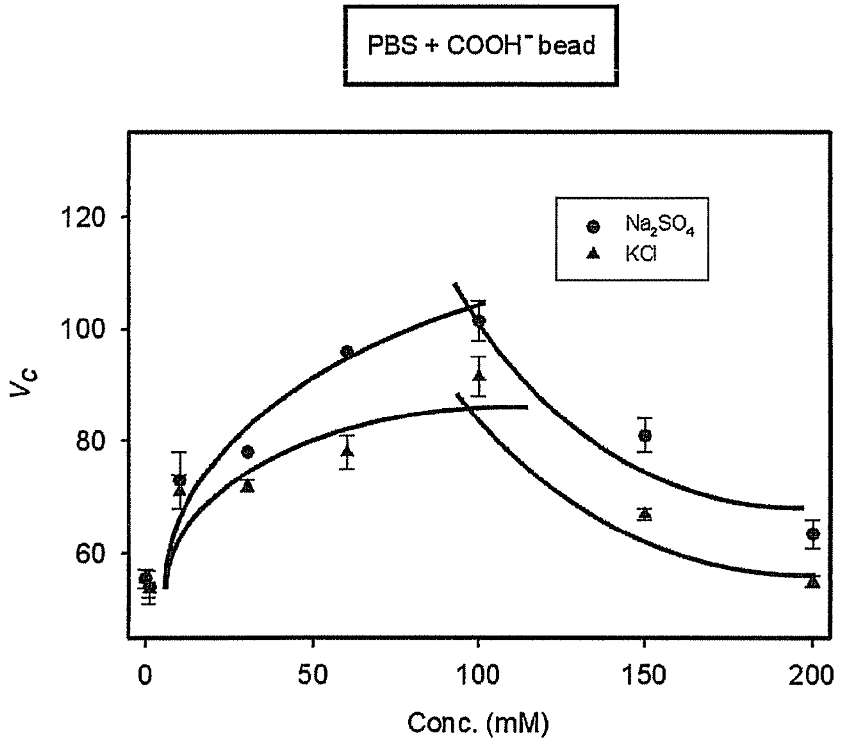
FIGS. 5A and 5B are graphs showing a threshold voltage measured while changing a concentration of an electrolyte added in Examples 3-1 and 3-2, respectively.
Figure 5B:
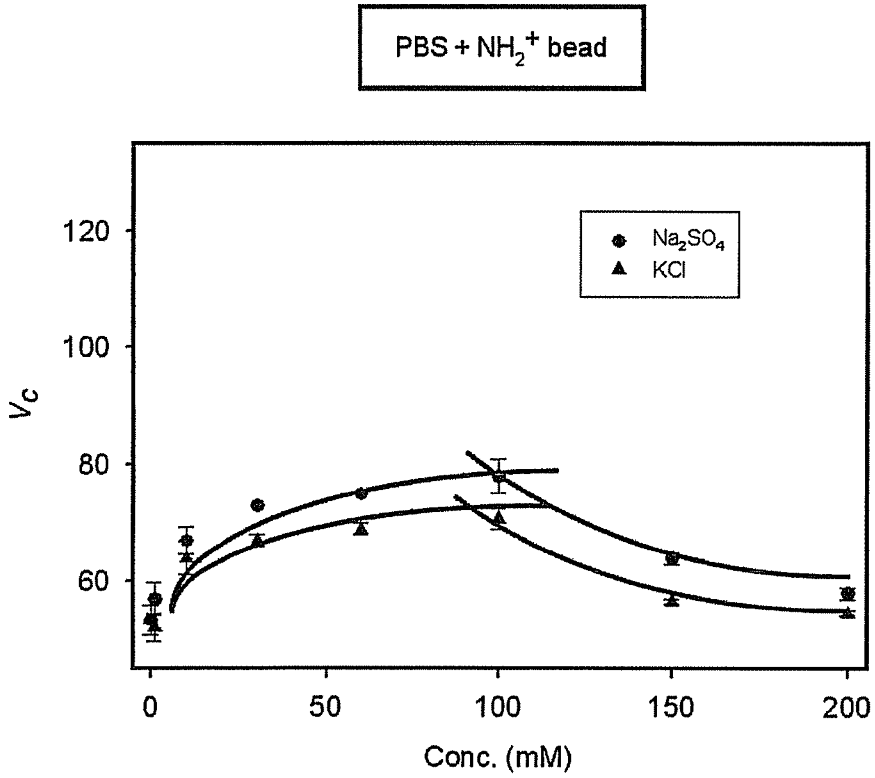

In FIGS. 5A and 5B showing the threshold voltage measured by changing the concentration of the electrolyte added in Example 3, it can be noted that if the particle having the negative charge or positive charge is included in the droplet, the two-element electrolyte or three-element electrolyte increases the threshold voltage effectively in the concentration range of 30 mM to 150 mM, especially 30 mM to 100 mM.

Figure 6:
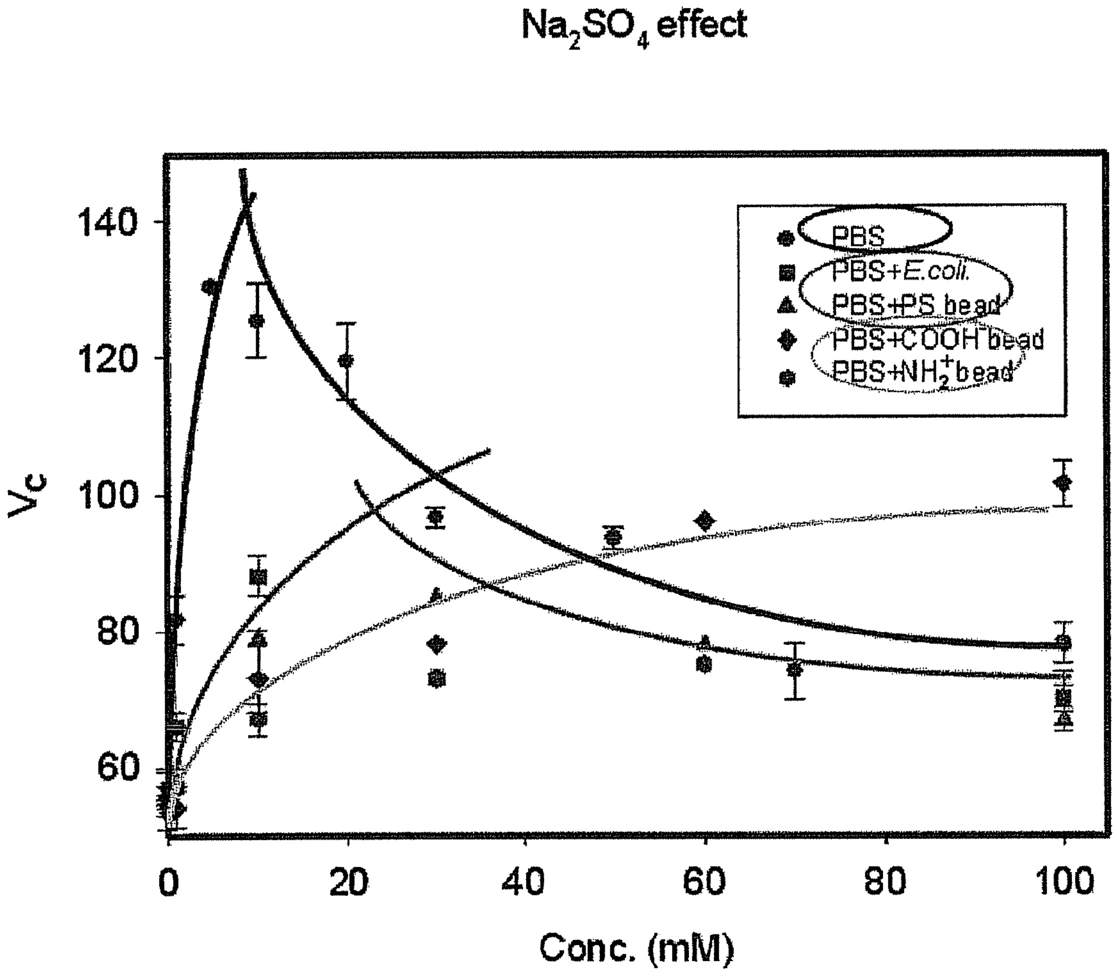
FIG. 6 is a graph showing the effect of $Na_2SO_4$ as the electrolyte added in Examples 1 to 3 in terms of the concentration thereof.

These results can be understood more clearly by referring to FIG. 6 unifiably showing the effect of $Na_2SO_4$ depending on the concentration change thereof in Examples 1 to 3.

Figure 7:
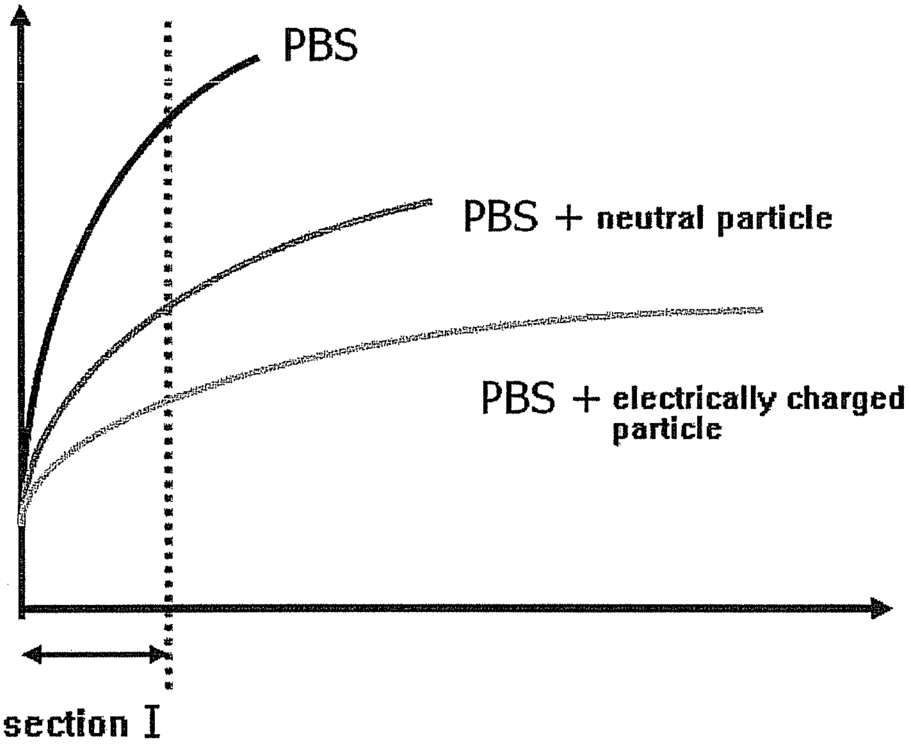
FIG. 7 is a graph showing the simplified measured values of the threshold voltage obtained in Examples, especially for the section I.
Figure 8:
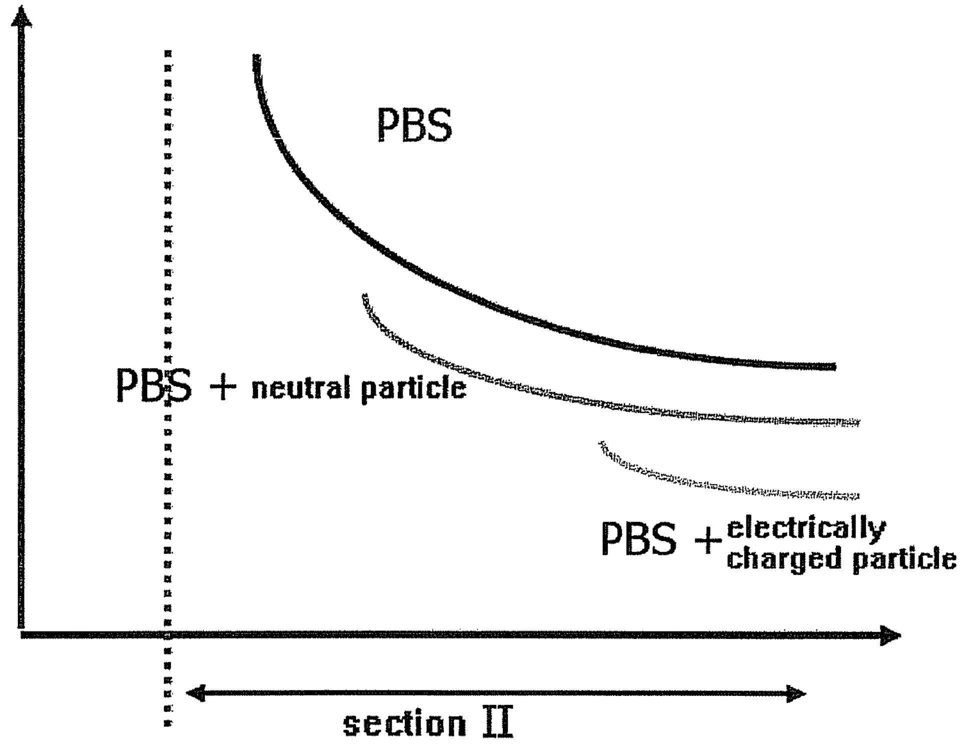
FIG. 8 is a graph showing the simplified measured values of the threshold voltage obtained in Examples, especially for the section II.

Meanwhile, the effect of the added electrolyte can be appreciated more clearly by referring to FIGS. 7 and 8 showing the simplified measured values of the threshold voltage obtained in Examples. The effect of the added electrolyte may be assessed in two sections phenomenologically. Section I is a section where the threshold voltage increases in proportion to the concentration of the added electrolyte, and section II is a section where the threshold voltage decreases rather than increases although the concentration of the added electrolyte increases.

In section I, the contact angle in electrowetting is changed because the electric conductivity of the total mixed electrolyte liquid is increased by the added electrolyte to thereby induce the further transport of the applied electric charge to the interface where the droplet contacts the insulating membrane. Such phenomenon actively develops as the concentration of the added electrolyte increases, thereby resulting in the increase of the threshold voltage in electrowetting.

The phenomenon, however, is altered if the electrolyte is added in the concentration above a certain concentration. As in section II, when the movement of the electric charge, (that is, an increase of the kinetic energy of the electric charge) by the high concentration of the electrolyte ion goes beyond the limit of surface energy, (which can lead to the contact angle change in the interface) the electrowetting phenomenon no longer takes place and the excessive kinetic energy functions to induce the dielectric breakdown of the insulating membrane. Consequently, in section II, the threshold voltage of electrowetting decreases rather than increases as the concentration of the added electrolyte increases.

The effect by addition of the particle in section I shown in FIG. 7 slows down the increasing effect of the threshold voltage as the concentration of the added electrolyte is increased beyond a certain point in the electrolyte droplet. As the neutral particle is included in the droplet, the droplet influences the surface condition at the interface where the droplet contacts the insulating membrane. This changes the surface energy that induces the electrowetting phenomenon. This change plays a role in inhibiting the threshold voltage increase caused by addition of the electrolyte. Furthermore, if the particle having the negative charge or positive charge exists in the droplet, +/− functional groups activated on the surface of the particle are ion-adsorbed to the added electrolyte ion. Thus, the additional transport effect of the electric charge by addition of the electrolyte is slowed down, thereby further decreasing the effect of increasing the threshold voltage.

The effect by addition of the particle in section II as shown in FIG. 8 has a smaller fluctuation unlike section I. This is because the effect of the excessive kinetic energy, by addition of the high concentration of the electrolyte, to induce the dielectric breakdown of the insulating membrane, works better than the effect of the particle addition.

According to the present invention as explained above, it is possible to increase the electrowetting threshold voltage, thereby promoting an enhancement of the change of the contact angle and velocity scope in the interface between hydrophobicity and hydrophilicity of the hydrophilic droplet. Further, the present invention allows for the development of droplet control apparatus. Therefore, according to the droplet and the droplet control apparatus of the invention, it is possible to more improve the operationability of the apparatus to which the electrowetting principle is applied, like LOC, liquid lens or the like.

While the present invention has been shown and described with respect to particular embodiments, it will be apparent to those skilled in the art that many changes and modifications may be made without departing from the spirit and scope of the inventions as defined in the appended claims.

What is claimed is:

1. A method for increasing the change of the contact angle of a hydrophilic droplet comprising:

disposing a hydrophilic droplet on an insulating surface of an electrode;

adding a two-element electrolyte or a three-element electrolyte to the hydrophilic droplet;

providing a nonpolar fluid at one or more interfaces of the hydrophilic droplet; and applying an external voltage to the electrode wherein the hydrophilic droplet includes one or more materials selected from the group consisting of an ionic particle, a neutral particle, and a magnetic particle.

2. The method according to claim 1, wherein the nonpolar fluid is oil or air.

3. The method according to claim 1, wherein the insulating surface includes one or more materials selected from the group consisting of Parylene C, polytetrafluoroethylene and metal oxide.

4. The method according to claim 1, wherein the electrode includes one or more materials selected from the group consisting of Indium Tin Oxide (ITO), Au/Cr, Al and a conductive polymer.

5. The method according to claim 1, wherein the two-element electrolyte is alkali metal halide, and the three-element electrolyte is an alkali metal sulfate or an alkali metal nitrate.

6. The method according to any one of claims 1, wherein the two-element electrolyte or three-element electrolyte is added in the concentration of 1 mM to 100 mM.

7. The method according to claim 5, wherein the two-element electrolyte or three-element electrolyte is added in the concentration of 1 mM to 30 mM.

8. The method according to claim 1, wherein if the material added in the droplet is neutral, a two-element electrolyte or a three-element electrolyte is added in the concentration of 1 mM to 100 mM.

9. The method according to claim 8, wherein if the material added in the droplet is neutral, the two-element electrolyte or three-element electrolyte is added in the concentration of 10 mM to 30 mM.

10. The method according to 1, wherein if the material added in the droplet has a negative charge or positive charge, the two-element electrolyte or three-element electrolyte is added in the concentration of 30 mM to 150 mM.

11. The method according to claim 9, wherein if the material added in the droplet has a negative charge or positive charge, the two-element electrolyte or three-element electrolyte is added in the concentration of 30 mM to 100 mM.

* * * * *